United States Patent
Choi

(10) Patent No.: US 7,333,149 B2
(45) Date of Patent: Feb. 19, 2008

(54) APPARATUS AND METHOD FOR CONVERTING ANALOG AND DIGITAL VIDEO FORMAT

(75) Inventor: Seung Jong Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 428 days.

(21) Appl. No.: 10/874,578

(22) Filed: Jun. 24, 2004

(65) Prior Publication Data
US 2005/0024532 A1    Feb. 3, 2005

(30) Foreign Application Priority Data
Jun. 25, 2003    (KR) ............... 10-2003-0041563

(51) Int. Cl.
*H04N 11/20*    (2006.01)
*H04N 5/46*    (2006.01)

(52) U.S. Cl. ............... 348/441; 348/558; 348/569; 348/554

(58) Field of Classification Search ........... 348/441, 348/443, 554–558, 705, 706; 345/600, 601, 345/156, 3.1–3.4
See application file for complete search history.

(56) References Cited

U.S. PATENT DOCUMENTS

| | | | |
|---|---|---|---|
| RE31,552 E * | 4/1984 | Barbin ............... 315/368.15 |
| 4,872,054 A * | 10/1989 | Gray et al. ........... 348/441 |
| 5,111,292 A * | 5/1992 | Kuriacose et al. ..... 375/240.01 |
| 5,790,096 A * | 8/1998 | Hill, Jr. ............. 345/600 |
| 6,373,527 B1 * | 4/2002 | Lee .................. 348/564 |
| 6,421,094 B1 * | 7/2002 | Han .................. 348/569 |
| 6,489,997 B1 * | 12/2002 | Stapleton ............. 348/441 |
| 6,501,510 B1 * | 12/2002 | Moon ................. 348/553 |
| 6,535,152 B2 * | 3/2003 | Lee .................. 341/118 |
| 6,791,620 B1 * | 9/2004 | Elswick et al. ........ 348/441 |
| 6,927,746 B2 * | 8/2005 | Lee et al. ............ 345/3.2 |
| 6,943,845 B2 * | 9/2005 | Mizutome et al. ...... 348/555 |
| 7,071,992 B2 * | 7/2006 | Chen et al. ........... 348/441 |
| 7,206,025 B2 * | 4/2007 | Choi ................. 348/441 |
| 2002/0063798 A1 * | 5/2002 | Koyama .............. 348/554 |

FOREIGN PATENT DOCUMENTS

KR    1020010090261 A    10/2001

* cited by examiner

*Primary Examiner*—Victor R. Kostak
(74) *Attorney, Agent, or Firm*—Birch, Stewart, Kolasch & Birch, LLP

(57) ABSTRACT

The present invention provides an apparatus for converting a video format of a digital TV and method thereof, by which various functions such as video format detection, color space conversion, chroma format conversion, gamma correction, geometric correction, image quality adjustment, and the like are implemented on one chip to support video signals of various specifications and display devices. The present invention includes an input video format detecting unit detecting a format of an input video, a format converting unit converting spatial resolution, frame rate, scan, aspect ratio, color space, and chroma format of the input video signal detected by the input video format detecting unit into a requested output format, a display characteristic correcting unit correcting the signal converted by the format converting unit to fit a display device, and an image quality adjusting unit adjusting an image quality of the corrected signal.

15 Claims, 13 Drawing Sheets

Original Iimage

Pincushion

Keystone

Tilt

APPARATUS AND METHOD FOR CONVERTING ANALOG AND DIGITAL VIDEO FORMAT

This application claims the benefit of the Korean Application No. P2003-41563 filed on Jun. 25, 2003, which is hereby incorporated by reference.

BACKGROUND OF THE INVENTION

1. Field of the Invention

The present invention relates to a digital TV, and more particularly, to an apparatus for converting a video format of a digital TV and method thereof.

2. Discussion of the Related Art

Currently, there are various kinds of video signal specifications and display devices representing to enable a user to view the video.

The video signal specifications include analog TV signal (e.g., NTSC, PAL, SECAM, etc.), VCR signal, PC signal (VGA~UXGA), recent digital TV signal (e.g., ATSC, DVB, ARIB), and the like.

And, the display devices for displaying the video signals include CRT, projection system, PDP (plasma display panel), LCD (liquid crystal display), and the like.

At the beginning era of digital broadcasting, demands for digital TV to support the various video specifications and display devices will rise.

SOC (system-on-chip) is realized due to the development of semiconductor processes, thereby enabling to implement various complicated functions on one chip.

Digital TV supports a multi-format via one specification unlike the conventional analog TV.

For instance, ATSC standards as U.S. terrestrial digital TV broadcasting standards support eighteen video formats so that a broadcasting station may select one of them.

The eighteen formats supported by ATSC are shown in Table 1.

TABLE 1

| Spatial resolution | Frame rate/scan | Aspect ratio | Format No. |
|---|---|---|---|
| 1920 * 1080 | 24P, 30P, 30I | 16:9 | 3 |
| 1280 * 720 | 24P, 30P, 60P | 16:9 | 3 |
| 704 * 480 | 24P, 30P, 30I, 60P | 16:9 | 4 |
|  | " | 4:3 | 4 |
| 640 * 480 | 24P, 30P, 30I, 60P | 4:3 | 4 |

In Table 1, video format means spatial resolution, frame rate, scanning system, and aspect ratio.

In order to enable transmission of various formats, a digital TV receiver needs to support various input formats. Namely, a digital TV receiver should be equipped with a function of converting various input formats into requested output formats to fit the corresponding format of its display device.

FIG. 1 is a diagram of a principle of video format conversion.

Referring to FIG. 1, a predetermined processing is performed on N-input formats to convert into N-output formats.

A digital TV format converting unit adopts a method of converting four formats including resolution, frame rate, scanning system, and aspect ratio.

FIG. 2 is a block diagram of a format converting device of a general digital TV, in which it is assumed that VSB (vestigial sideband) modulation is performed on an RF type TV signal.

Referring to FIG. 2, a VSB demodulator 201 demodulates an inputted RF type digital TV signal to output to a TS demultiplexer 202 via TS (transport stream) form. The TS demultiplexer 202 selects one of a plurality of programs included in one channel, separates audio bit stream and video bit stream, which are multiplexed in the selected program, from each other, and then outputs the separated video bit stream to an MPEG2 (motion picture experts group 2) video decoder 203 and the separated audio bit stream to an audio decoder 205.

The MPEG2 video decoder 203 performs variable length decoding (VLD) on pure data information resulting from removing overheads (various header information, start code, etc.) from the inputted video bit stream, restores an original pixel value via motion compensation using de-quantization, IDCT (inverted discrete cosine transform), and motion vector, and then outputs the restored pixel value to a format converting unit 204.

And, the audio decoder 205 restores an original audio signal from the inputted audio bit stream using MPEG algorithm, audio coding algorithm (AC-3), or the like and then outputs the restored original audio signal to a speaker and the like.

The format converting unit 204 extracts four kinds of format information included in a digital broadcast signal transmitted from a broadcasting station, i.e., resolution, frame rate, scanning system, and aspect ratio, and converts the broadcast signal into a video format fitting a display device using them (ex. 1920×1080 30i(16:9), where 'i' indicates interlace scan).

However, the related art video format converting device has the following problems or disadvantages.

First of all, the video format converting device needs a separate format converter to support an analog signal as well as a digital TV signal. Namely, the video format converting device fails to include a format converting unit for processing other video signals such as an analog signal despite having the digital TV signal format converting unit. Hence, an auxiliary format converting unit, as shown in FIG. 3, is further needed.

Referring to FIG. 3, an auxiliary format converting unit 301 performing format conversion on analog TV signal, PC signal, component signal, and the like is added to the construction of FIG. 2. In this case, a video signal format-converted in the digital TV format converting unit 204 or the auxiliary format converting unit 301 is selected via a multiplexer 302 to be outputted.

Secondly, the analog signal fails to include format information therein. In digital TV signal, format information is attached to a header to be transmitted so that the format information can be extracted from the header. Yet, it is unable to detect format information from the analog video signal failing to have such information. Hence, a device for detecting format information is further needed.

Thirdly, in case that the video format converting device needs to support an analog signal, a separate color space and chroma format converter is further needed.

Hence, the auxiliary format converting unit 301 in FIG. 3 is developed into a construction shown in FIG. 4 to settle the above problems.

For instance, an inputted NTSC composite signal is separated into a horizontal/vertical sync signal, a brightness signal Y, and a color signal C. If necessary, the signals pass through color space conversion (e.g., YIQ→YCbCr) and chroma format conversion (e.g., 4:4:4→4:2:2) in a color converting unit 404 to be inputted to a format converting unit 406.

Moreover, a PC signal (VGA~UXGA) is inputted as an RGB form via an RGB input unit 402. If necessary, the PC signal pass through color space conversion (e.g., RGB→YCbCr) and chroma format conversion (e.g., 4:4:4→4:2:2) in a color converting unit 405 to be inputted to the format converting unit 406. And, a component signal (480i~1080i) is inputted to the format converting unit 406 via an input unit 403 without passing through color conversion.

Thus, in order to handle external video signals including analog TV signal, PC signal, component signal, and the like, the related art needs the separate device performing color space conversion and chroma format conversion in FIG. 4.

FIG. 5 is a diagram of an example of conversion between various color spaces. For instance, if a color space of an input video is GBR and a color space of a requested output video is YIQ, a corresponding relation is expressed by Equation 1.

$$\begin{pmatrix} Y \\ I \\ Q \end{pmatrix} = \frac{1}{256} \begin{pmatrix} 150 & 29 & 77 \\ -70 & -82 & 153 \\ -134 & 80 & 54 \end{pmatrix} \begin{pmatrix} G \\ B \\ R \end{pmatrix} \quad \text{[Equation 1]}$$

$$Y = \frac{1}{256}(150 \times G + 29 \times B + 77 \times R)$$

$$I = \frac{1}{256}(-70 \times G - 82 \times B + 153 \times R)$$

$$Q = \frac{1}{256}(-134 \times G + 80 \times B + 54 \times R)$$

Fourthly, in case that the video format converting device needs to support various display devices, a separate gamma correction and geometric correction device is needed. Gamma correction means to correct various distortions occurring due to color characteristics of a display device. Hence, all kinds of display devices need gamma correction.

And, geometric correction is to correct various geometric distortions occurring due to display device characteristics shown in FIGS. 6A to 6D. Especially, the geometric distortion becomes serious not in PDP, LCD, and the like but in CRT and projection systems.

Fifthly, in case that the video format converting device supports an image quality adjustment function of brightness, contrast, color, hue, color temperature, and the like, image quality adjustment in an analog area is fine. Yet, in a digital display such as PDP and LCD, an image quality is firstly adjusted by D/A conversion of a video signal and A/D conversion is then executed. Hence, the corresponding image quality tends to be degraded. This is explained as follows by referring to the attached drawings.

FIG. 7A is a block diagram of an image quality adjusting unit of an analog display device according to a related art.

Referring to FIG. 7A, a digital signal converted via a format converting unit 701 is converted to an analog signal by a D/A converting unit 702 so that an image quality is adjusted in an image quality adjusting unit 703. Hence, an analog display is free from image quality degradation.

Yet, in a digital display, as shown in FIG. 7B, a digital signal converted via a format converting unit 701 is converted to an analog signal by a D/A converting unit 702 to be adjusted in an image adjusting unit 703. And, the adjusted analog signal is then converted again to a digital signal by an A/D converting unit 704 to be outputted, thereby bringing about the image quality degradation.

SUMMARY OF THE INVENTION

Accordingly, the present invention is directed to an apparatus for converting a video format of a digital TV and method thereof that substantially obviate one or more problems due to limitations and disadvantages of the related art.

An object of the present invention is to provide an apparatus for converting a video format of a digital TV and method thereof, by which various functions such as video format detection, color space conversion, chroma format conversion, gamma correction, geometric correction, image quality adjustment, and the like are implemented on one chip to support video signals of various specifications and display devices.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for converting a video format according to the present invention includes an input video format detecting unit detecting a format of an input video, a format converting unit converting spatial resolution, frame rate, scan, aspect ratio, color space, and chroma format information of the input video signal detected by the input video format detecting unit into a requested output format, a display characteristic correcting unit correcting the signal converted by the format converting unit to fit a display device, and an image quality correcting unit adjusting an image quality of the corrected signal.

Preferably, the format detecting unit, the format converting unit, the display characteristic correcting unit, and the image quality correcting unit are implemented on one chip.

Preferably, if the input video signal has a compressed form, the apparatus further includes a video decoding unit decoding the compressed form of the input video signal.

Preferably, if a compressed output video signal is requested, the apparatus further includes a video encoding unit compressing the format-converted video signal.

Preferably, at least one of the input video signal exists and at least one of the format-converted outputted video signal exists.

Preferably, the input video signal is selected from the group consisting of an analog video signal, a digital TV broadcast signal, a digital video signal, and a PC signal.

Preferably, if the input video signal is digital, the input video format detecting unit detects a format from a header of the input video signal.

Preferably, if the input video signal is analog, the input video format detecting unit detects a format using a sync signal of the input video signal or format information separately informed from outside.

Preferably, the signals processed in the format detecting unit, the format converting unit, the display characteristic correcting unit, and the image quality correcting unit are digital.

Preferably, the display device includes an analog display and a digital display.

Preferably, the display characteristic correcting unit performs gamma correction and geometric correction.

Preferably, the image quality adjusting unit directly handles a digital signal processed by the format converting unit.

In another aspect of the present invention, a method of converting a video format includes the steps of deciding whether an input video signal is an analog signal or a digital signal, if the input video signal is the analog signal, deciding whether a real video signal exists, if the analog input video signal substantially exists, detecting video format information of the corresponding signal, and converting a format of the corresponding signal from the detected video format information.

Preferably, the video format information is detected by a sync signal of the input video signal or by user's designation.

Preferably, if the input video signal fails to substantially exist, a background color or a predetermined pattern is displayed on a display device.

Preferably, the format is for spatial resolution, frame rate, scan, aspect ratio, color space, and chroma of the input video signal.

Preferably, after deciding whether the real video signal exists if the input video signal is the digital signal, the video format information of the corresponding signal is detected if the digital input video signal substantially exists.

More preferably, the video format information is detected by a video decoder.

More preferably, if the input video signal fails to substantially exist, a background color or a predetermined pattern is displayed on a display device.

More preferably, the format of the corresponding signal is converted from the detected video format information.

More preferably, the format is for spatial resolution, frame rate, scan, aspect ratio, color space, and chroma of the input video signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 8:
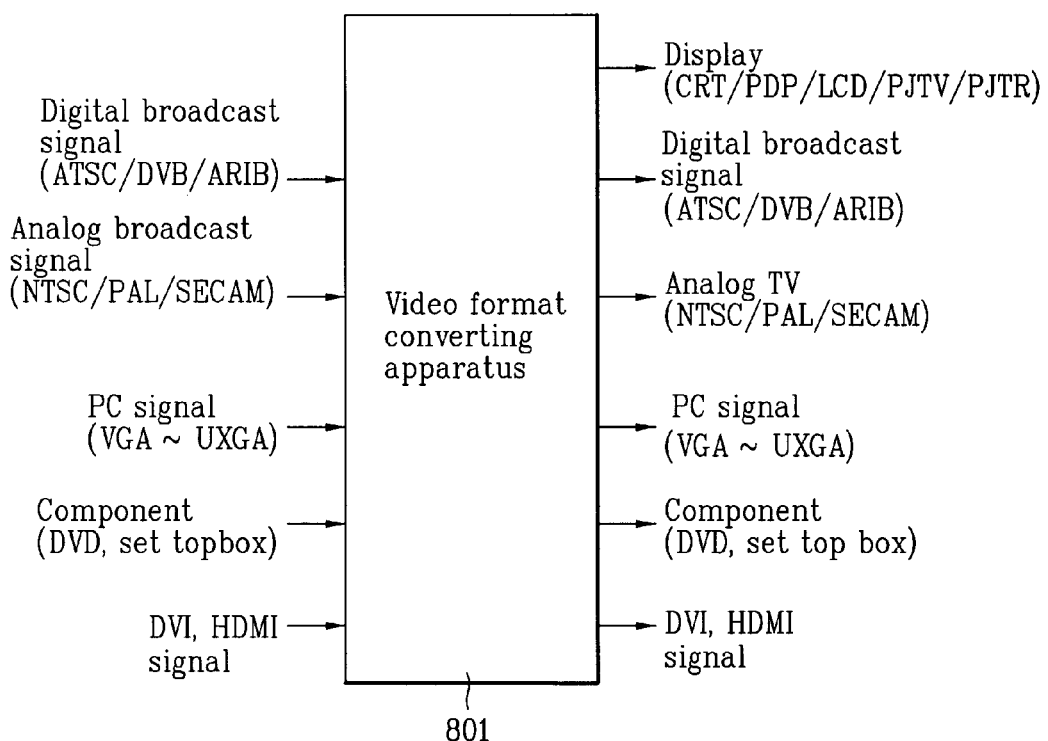
FIG. 8 is a block diagram of a video format converting apparatus according to the present invention.

FIG. 8 is a block diagram of a video format converting apparatus according to the present invention.

Referring to FIG. 8, a video format converting apparatus supports various video input signals.

For instance, digital broadcast signal (ATC/DVB/ARIB), analog broadcast signal (NTSC/PAL/SECAM), PC signal (VGA~UXGA), component signal of DVD or set-top box, DVI (digital video interactive) signal, HDMI (high-definition multimedia interface) signal, and the like could be inputs to the video format converting apparatus.

And, the video format converting apparatus includes one chip without a separate additional circuit and converts the various video signals into output signals of intended formats, respectively.

Hence, the output signals have various formats of display drive signals (CRT/PDP/LCD/PJTV/PJTR), digital broadcast signals (ATSC/DVB/ARIB), analog TV signals (NTSC/PAL/SECAM), PC signals (VGA~UXGA), component signal, DVI signals, HDMI signals, and the like.

Moreover, the video format converting apparatus 801 combines to perform color space conversion, chroma format conversion, gamma correction, geometric correction, image quality adjustment, and the like as well as converts spatial resolution of an input video signal, frame rate, scan, and aspect ratio. And, the detailed formats are as follows: 1) Spatial resolution: 670*480, 720*480, 1280*720, 1920*1080, etc; 2) Frame rate (Hz): 24, 30, 59.94, 60, 80, 100, etc.; 3) Scan: interlaced, progressive; 4) Aspect ratio: 4:3, 14:9, 16:9, 20:9, etc.; 5) Chroma format: 4:2:0, 4:1:1, 4:2:2, 4:4:4, etc.; 6) Color space: RGB, YCbCr, YUV, YIQ, etc.; 7) Gamma correction; 8) Geometric correction; and 9) Image quality adjustment: brightness, contrast, color, hue, color temperature, etc.

In this case, a series of functions performed by the video format converting apparatus are entirely digital-processed.

Figure 9:
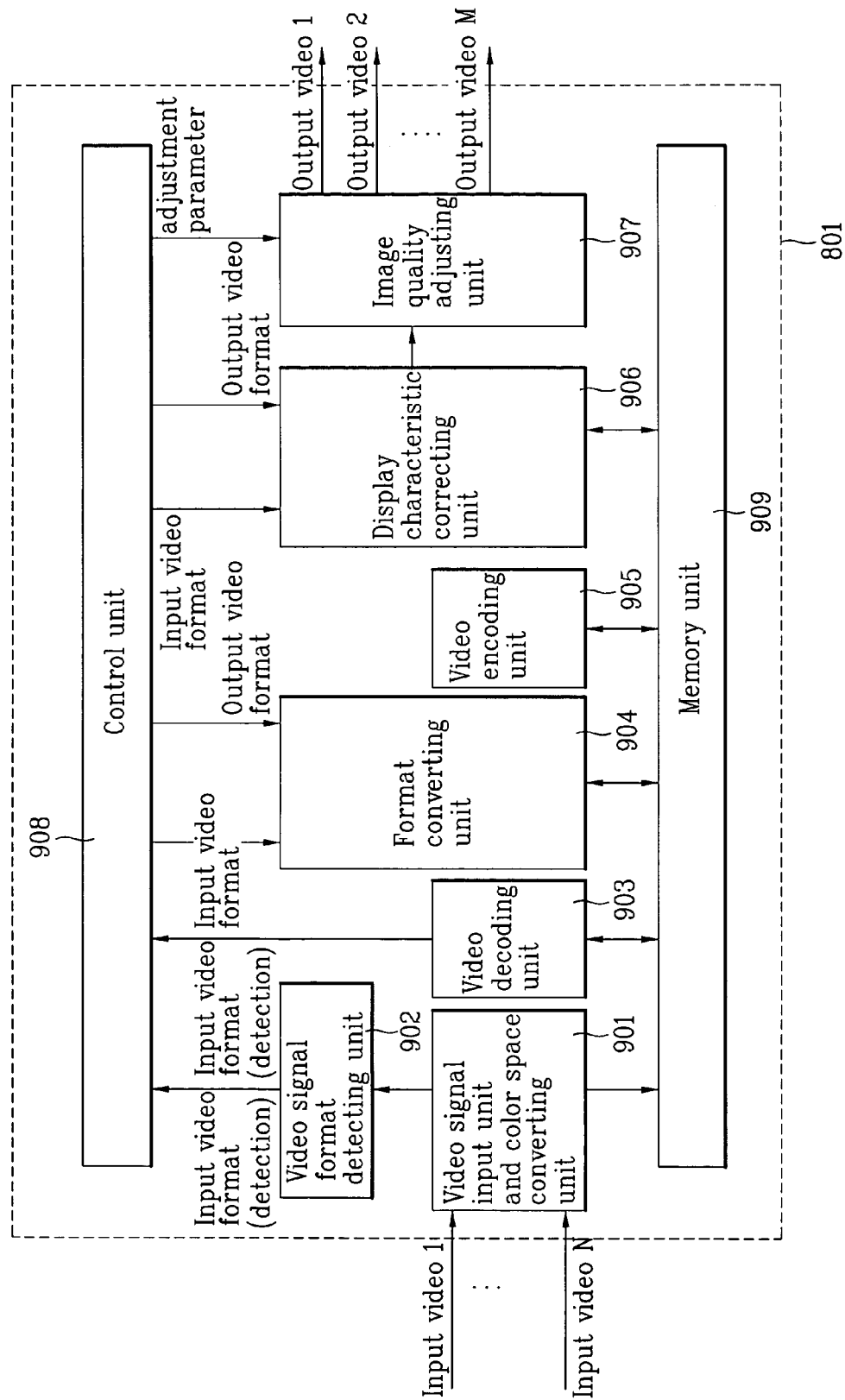
FIG. 9 is a detailed block diagram of a video format converting apparatus according to the present invention.

FIG. 9 is a detailed block diagram of a video format converting apparatus according to the present invention.

Referring to FIG. 9, a video format converting apparatus according to the present invention includes a video signal input and color space converting unit 901 performing various interfaces to receive video signals, storing the inputted video signals in a memory if necessary, and performing color space conversion, a video format converting unit 902 detecting various formats of the inputted video signals, and a video decoding unit 903 performing decoding on the inputted signals if the inputted video signals are digital broadcast signals, i.e., compressed digital bit streams.

And, the video format converting apparatus further includes a control unit 908 controlling overall operations of the video format converting apparatus, a format converting unit 904 performing format conversion of the video signals according to input video format information and output video format information inputted from the control unit 908, a video encoding unit 905 used if user-requesting output video format is a digital broadcast signal, i.e., a compressed form, a characteristic correcting unit 906 performing gamma correction and geometric correction according to display characteristics, an image quality adjusting unit 907 adjusting brightness, contrast, color, hue, color temperature, and the like on a screen, and a memory unit 909 storing data on format conversion, correction, video decoding, and encoding.

An operation of the above-constructed video format converting apparatus is explained in detail as follows.

First of all, video signals capable of various specifications are inputted to the video input and color space converting unit 901 via an interface matching synchronization, bandwidth, and the like. Simultaneously, if necessary, the input video signals are stored in the memory unit 909. And, the video signal input and color space converting unit 901 performs color space conversion between the input and output video signals, if necessary.

Subsequently, the video signal format detecting unit 902 detects format information of the input video signals. The detected format information of the input video signal is transferred to the control unit 908.

In doing so, if the input video signals are digital broadcast signals, i.e., compressed bit stream, the video decoding unit 903 decodes the digital broadcast signals. And, an MPEG2 MP2HL decoder can be used as the video decoding unit 903.

The format converting unit 904 receives the format information of the input video signals from the control unit 908 and then converts a format of the input video signals into a format of a user-requesting format of the output video signals. Namely, the format converting unit 904 performs conversions of spatial resolution, frame rate, scan, aspect ratio, and chroma format of the input video signals.

In doing so, if the user-requesting output video format has a form of digital broadcast signal, i.e., if the user-requesting output video format is a compressed bit stream, the video encoding unit 905 compresses the format-converted video signals.

And, the display characteristic correcting unit 906 performs gamma correction and geometric correction on the format-converted video signals according to a corresponding display.

In this case, gamma correction is to correct various distortions occurring due to color characteristics of the display device. Hence, gamma correction is needed for all kinds of display devices.

And, as mentioned in the foregoing description in FIGS. 6A to 6D, geometric correction is to correct various geometric distortions occurring due to characteristics of a display device. The geometric distortions especially become a major issue not in digital display device such as PDP, LCD, and the like but in the CRT or projection system.

Thereafter, the image quality adjusting unit 907 is provided with image quality adjustment parameters by the control unit 908, adjusts such an image quality as brightness, contrast, color, hue, color temperature, and the like of the corrected signal, and then outputs the image-quality adjusted signal to the display device.

Figure 10:
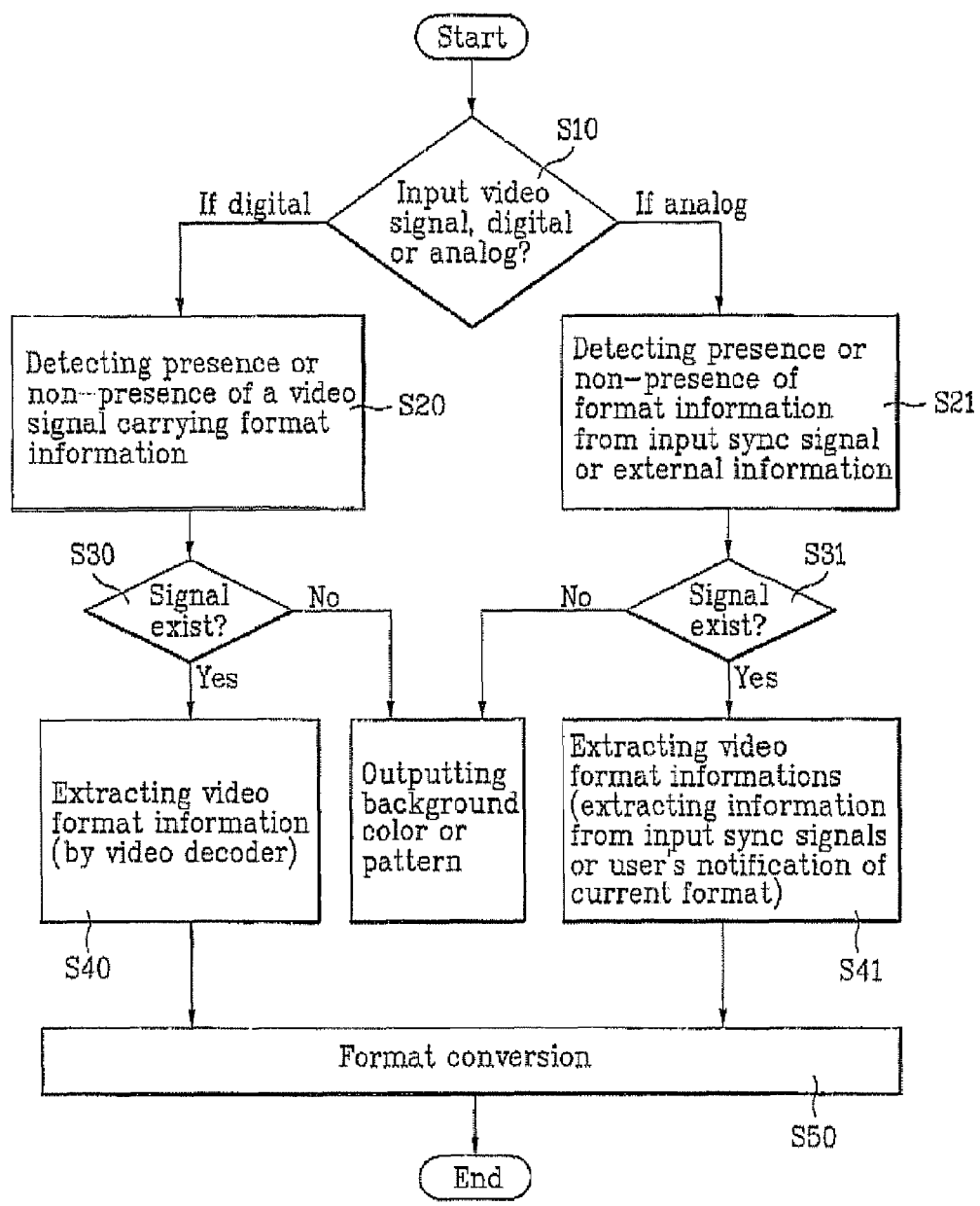
FIG. 10 is a flowchart of an operation from a video format detecting unit to a format converting unit in a video format converting apparatus according to the present invention.

FIG. 10 is a flowchart of an operation between the video format detecting unit 902 and the format converting unit 904 in the video format converting apparatus according to the present invention.

Referring to FIG. 10, once a video signal is inputted, the video signal format detecting unit decides whether the inputted video signal is a digital signal (e.g., compressed digital bit stream) or an external input signal (e.g., computer video signal) (S10).

If the input signal is decided as the digital signal, the video signal format detecting unit detects a presence or non-presence of a real video signal carrying digital format information (S20).

If it is decided that there is no video signal carrying digital format information (S30), the video signal format detecting unit sends a predetermined signal to the control unit. And, the control unit sends a control signal to the display device to display a background color or an image of a predetermined pattern.

On the other hand, if it is decided that the video signal is carrying the digital format information, the video signal format detecting unit detects the digital format information of the input digital video signal (S40). In doing so, the presence or non-presence of the real video signal and the format information of the video signal are attained from the video signal decoded by the video decoding unit 903.

Meanwhile, if the input video signal is decided as the external input signal, the video format detecting unit detects presence or non-presence of a real video signal carrying analog format information from a sync signal of the external input signal since the external input signal fails to separately carry the format information thereon (S21).

If it is decided that there exists no video signal substantially carrying analog format information (S31), the display device displays the background color or the predetermined pattern like the step S30.

On the other hand, if it is decided that the analog signal is carrying analog format information (S31), the video signal format detecting unit extracts the analog format information of the input video signal using a sync signal of the input video signal or by a user's separate designation (S41).

This is because the external input signal fails to separately include format information of the corresponding signal therein.

After a format of the input video signal has been detected, the control unit 908 sends the format information of the demanded output video signal and the format information of the input video signal to the format converting unit 904 and the display characteristic correcting unit 906.

After having brought the input video signal stored in the memory unit 909, the format converting unit 904 converts resolution, frame rate, scan, aspect ratio, chroma format, and the like of the input video signal so as to store the converted video signal in the memory unit 909 again.

Meanwhile, the display characteristic correcting unit 906 brings the video signal, which is format-converted in the format converting unit and stored in the memory unit 909, and then performs color space conversion, gamma correction, geometric correction, and the like (S50).

In doing so, gamma correction varies a brightness (Y) value of the video signal. Hence, gamma correction can be a sort of format conversion.

Finally, the corrected video signal passes the image quality adjusting unit 907 to be outputted to the display device.

Figure 11:
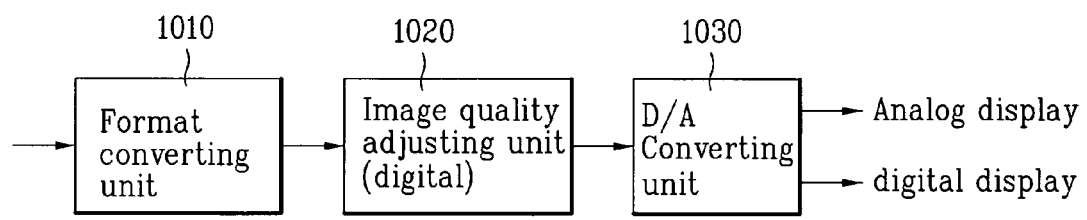
FIG. 11 is a block diagram for detailed image quality adjustment of a video format converting-apparatus according to the present invention.

FIG. 11 is a block diagram for detailed image quality adjustment of a video format converting apparatus according to the present invention.

Referring to FIG. 11, an image quality of a digital video signal format-converted via a format converting unit 1010 is adjusted by a digital image quality adjusting unit 1020.

In using an analog display device, the digital video signal adjusted by the digital image quality adjusting unit 1020 is converted to an analog video signal by a D/A converting unit 1030 to be outputted.

On the other hand, in using a digital display device, the digital video signal bypasses the D/A converting unit to be outputted.

Thus, the video format converting apparatus according to the present invention adopts the digital image quality adjusting unit, thereby enabling to avoid image quality degradation.

Figure 12:
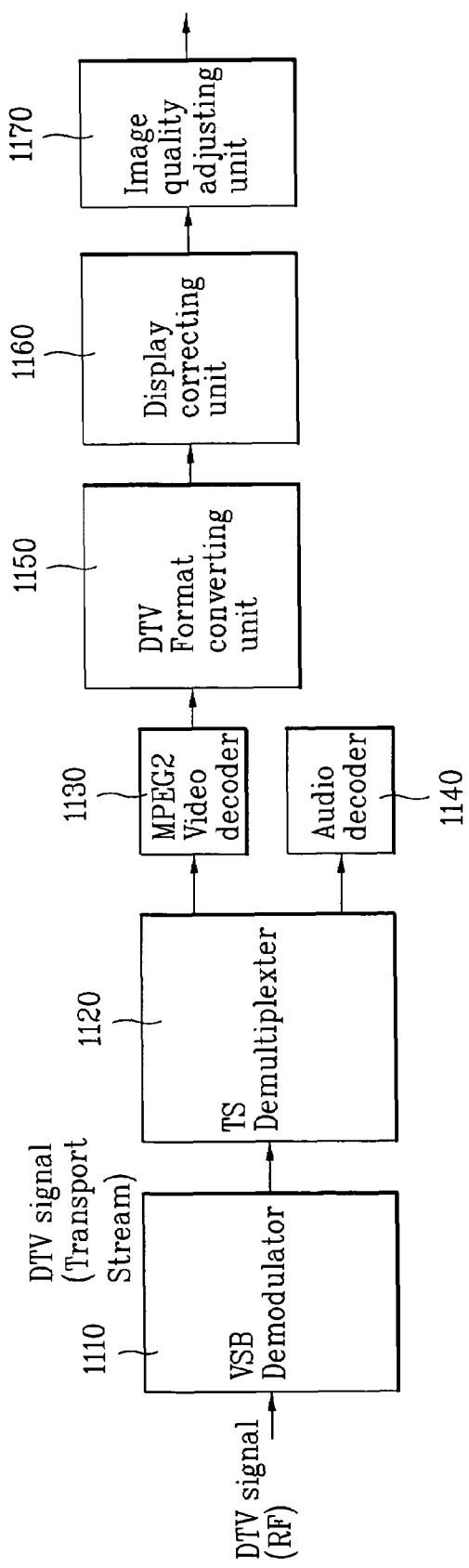
FIG. 12 is a block diagram of a digital TV including a video format converting apparatus according to the present invention.

FIG. 12 is a block diagram of a digital TV including a video format converting apparatus according to the present invention.

Figure 1:
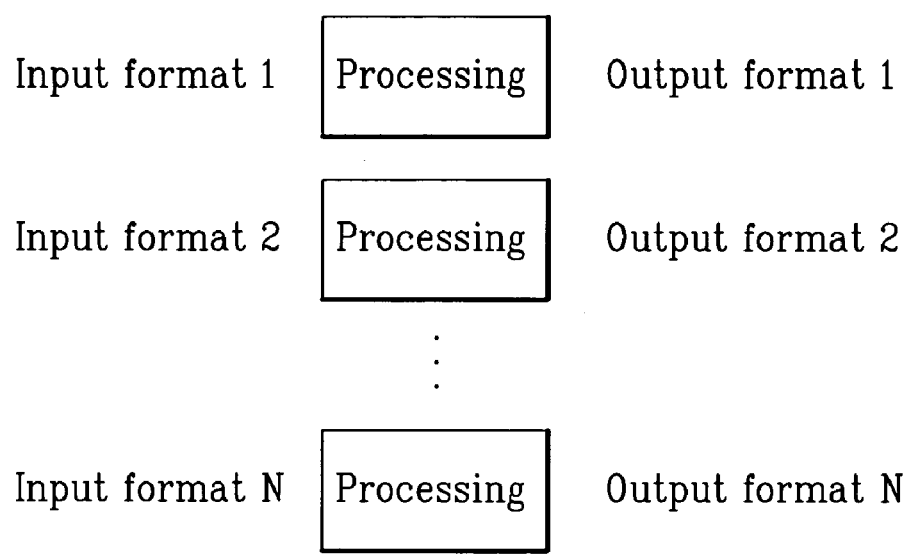
FIG. 1 is a diagram of a principle of video format conversion.
Figure 2:
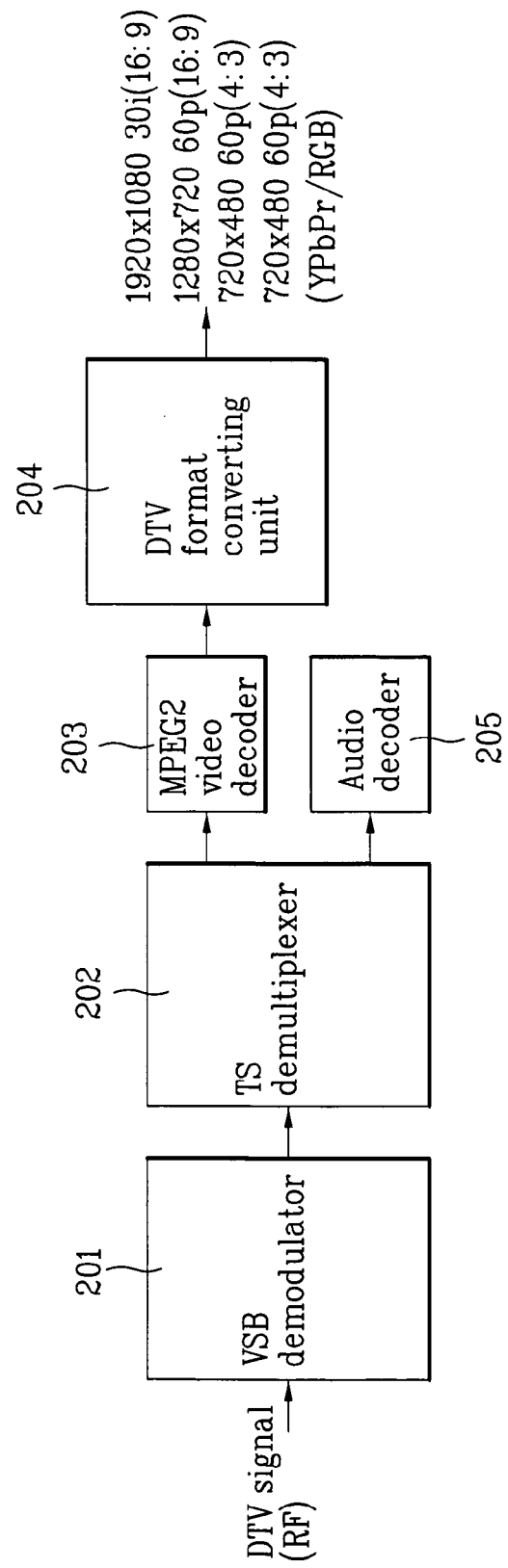
FIG. 2 is a block diagram of a format converting device of a digital TV according to a related art.
Figure 3:
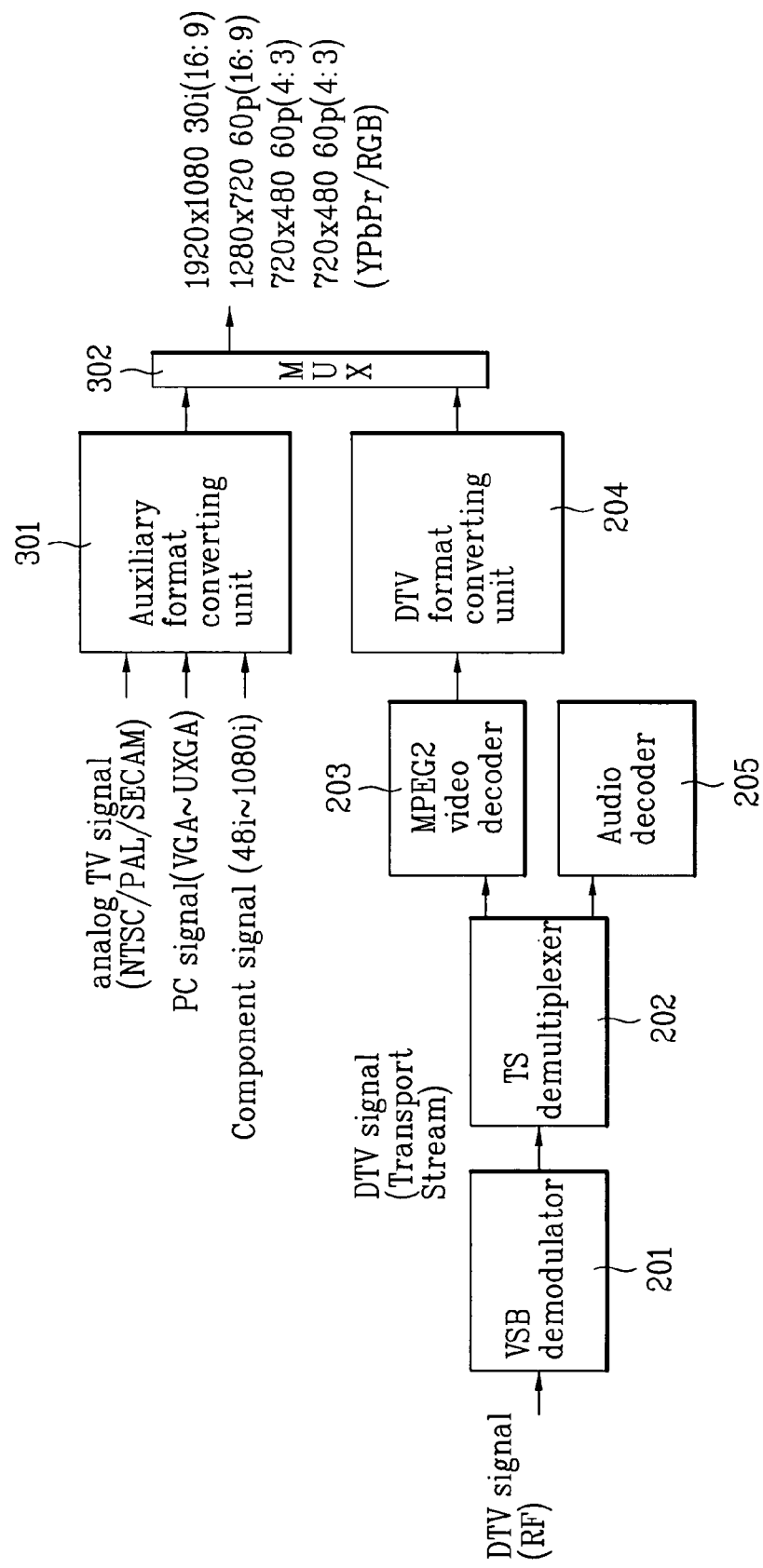
FIG. 3 is a diagram of an auxiliary format converting unit added to a construction of FIG. 2.
Figure 4:
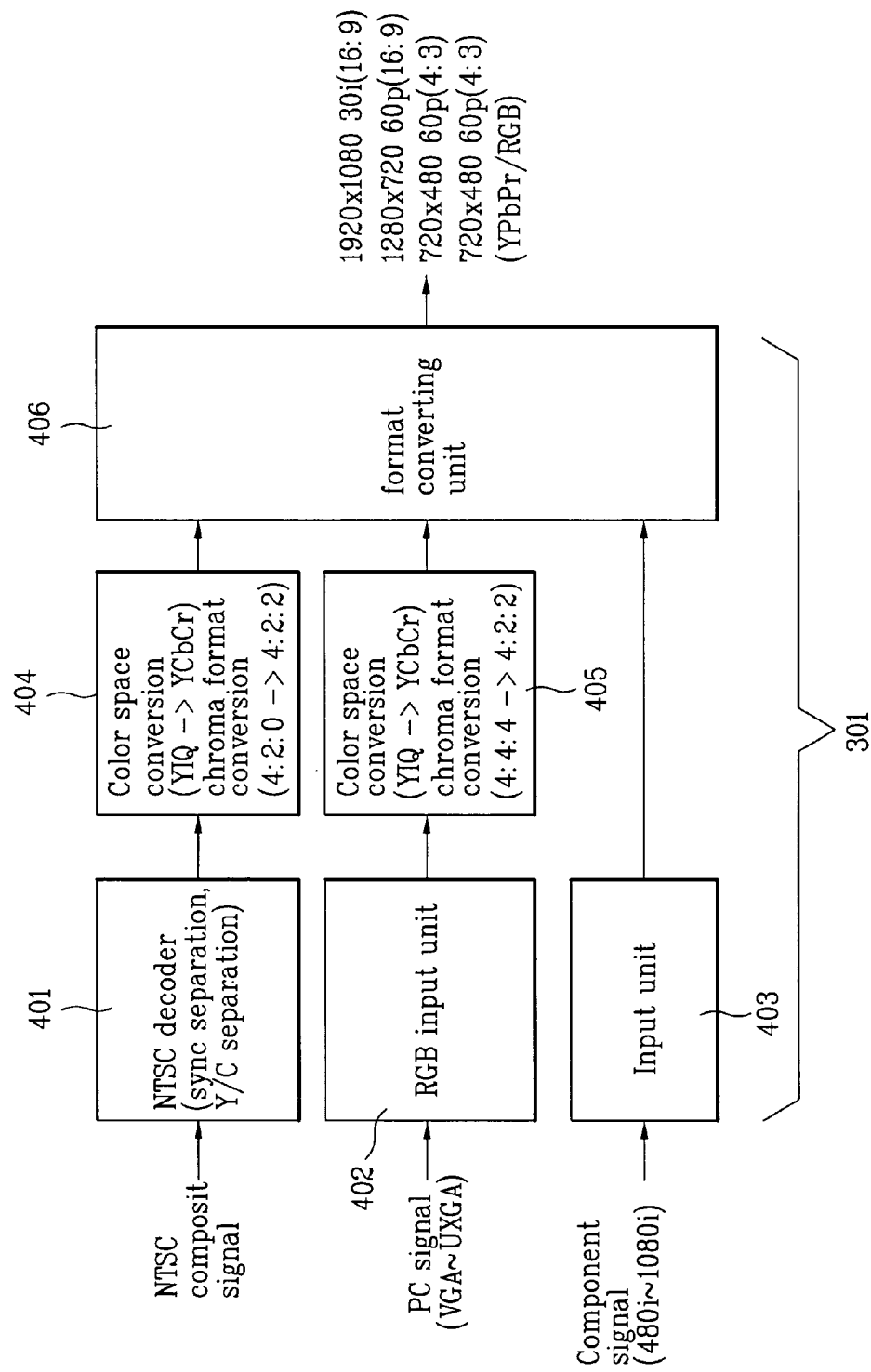
FIG. 4 is a detailed diagram of an added format converting unit in FIG. 3.
Figure 5:
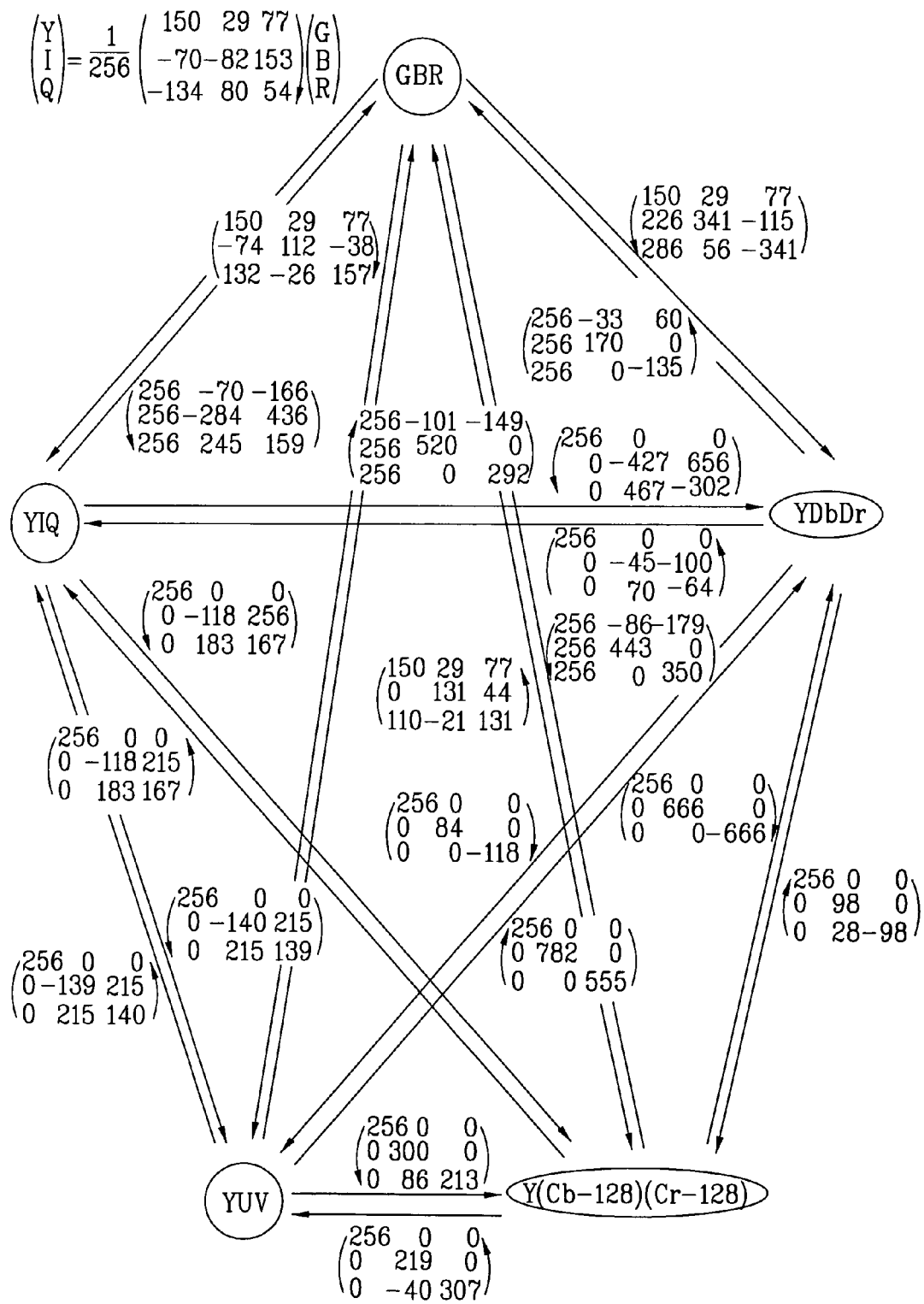
FIG. 5 is a diagram of an example of conversion between various color spaces.
Figure 6A:
FIGS. 6A to 6D are exemplary pictures of geometric distortions of a display device.
Figure 6B:
Figure 6C:
Figure 6D:
Figure 7A:
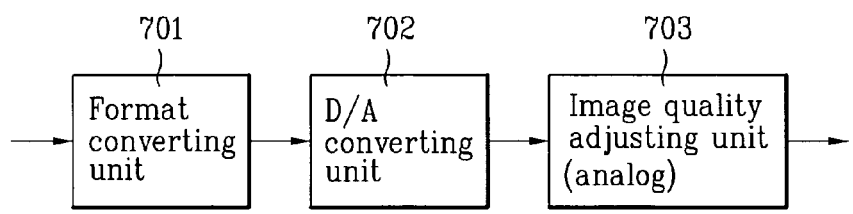
FIG. 7A and FIG. 7B are block diagrams of image quality adjustment of a digital TV according to a related art.
Figure 7B:
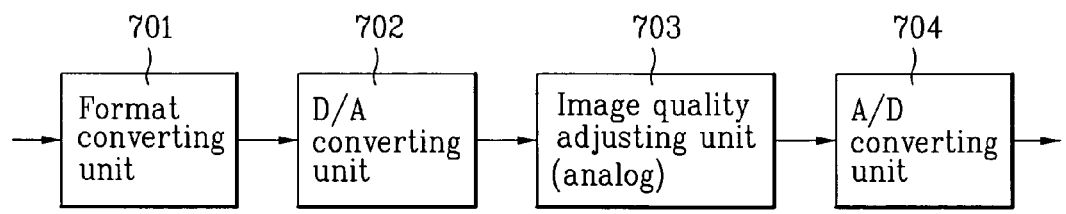

Referring to FIG. 12, the constitution of a VSB demodulator 1110, a TS de-multiplexer 1120, an MPEG2 video decoder 1130, an audio decoder 1140, and a format converting unit 1150 is equivalent to that in FIG. 2, of which explanation is skipped in the following description.

The format converting unit 1150 performs five kinds of format conversions including spatial resolution, frame rate, scan, aspect ratio, and chroma format.

And, a display characteristic correcting unit 1160 performs gamma correction and geometric correction on the format-converted video signal.

Subsequently, as mentioned in the description of FIG. 11, an image quality of the corrected signal is adjusted by an image quality adjusting unit 1170 and the adjusted signal is then displayed via a display device (not shown in the drawing).

Accordingly, the video format converting apparatus according to the present invention, in which various functions of format conversions between various video specifications, display characteristic correction, and image quality adjustment are implemented on one chip, has the following effects or advantages.

First of all, the present invention supports various video signal specifications for analog TV signal, component signals (480i, 480p, 720p, 1080i, etc.), DVI signal, HDMI signal, and the like as well as digital broadcast signal.

Secondly, the present invention corrects display characteristics of input video, thereby supporting various display devices such as CRT, projection, PDP, LCD, etc.

Thirdly, the present invention adopts the digital image quality adjusting unit, thereby avoiding image quality degradation of the display device.

Finally, the present invention implements digital TV video signal processing via one chip, thereby enabling to reduce a dimension and cost of hardware.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for converting a video format, comprising:
   a video signal input unit receiving an input video signal;
   an input video format detecting unit detecting a format of the input video signal, said input video format detecting unit determining whether the received video signal is a digital or analog video signal, and if the received video signal is a digital signal, the input video format detecting unit detects a format from a header of the input video signal, and if the received video signal is an analog signal, the input video format detecting unit detects a format using a sync signal of the input video signal or external format information;
   a format converting unit converting a spatial resolution, frame rate, scan, aspect ratio, color space, and chroma format of the input video signal detected by the input video format detecting unit into a requested output format;
   a display characteristic correcting unit correcting the signal converted by the format converting unit to fit a display device; and
   an image quality adjusting unit adjusting an image quality of the corrected signal.

2. The apparatus of claim 1, wherein the format detecting unit, the format converting unit, the display characteristic correcting unit, and the image quality adjusting unit are implemented on one chip.

3. The apparatus of claim 1, wherein if the input video signal has a compressed form, the apparatus further comprises a video decoding unit decoding the compressed form of the input video signal.

4. The apparatus of claim 1, wherein if a compressed output video signal is requested, the apparatus further comprises a video encoding unit compressing the format-converted video signal.

5. The apparatus of claim 1, wherein the input video signal is selected from an analog video signal, a digital TV broadcast signal, a digital video signal, and a PC signal.

6. The apparatus of claim 1, wherein the signals processed in the format detecting unit, the format converting unit, the display characteristic correcting unit, and the image quality adjusting unit are digital.

7. The apparatus of claim 1, wherein the display device includes an analog display or a digital display.

8. The apparatus of claim 1, wherein the display characteristic correcting unit performs gamma correction and geometric correction.

9. The apparatus of claim 1, wherein the image quality adjusting unit directly handles a digital signal processed by the format converting unit.

10. A method of converting a video format, comprising:
    deciding whether an input video signal is an analog signal or a digital signal;
    if the input video signal is the analog video signal, deciding whether analog video format information corresponding to the analog video signal exists;
    if the analog video format information corresponding to the analog video signal exists, detecting the analog video format information corresponding to the analog video signal; and
    converting a format of the corresponding signal from the detected analog video format information,
    wherein if the analog video format information does not exist, the method further comprises displaying a background color or a predetermined pattern on a display device.

11. The method of claim 10, wherein the analog video format information is detected by a sync signal of the input video signal or by a user's designation.

12. The method of claim 10, wherein video formats for the analog and digital signals include a spatial resolution, frame rate, scan, aspect ratio, color space, and chroma format.

13. The method of claim 10, wherein, if the deciding step decides the input video signal is the digital signal, the method further comprises deciding whether the digital video signal is carrying digital video format information, and detects the digital video format information of the corresponding digital video signal if the digital video format information exists.

14. The method of claim 13, wherein the digital video format information is detected by a video decoder.

15. A method of converting a video format, comprising:
deciding whether an input video signal is an analog signal or a digital signal;
if the input video signal is the analog video signal, deciding whether analog video format information corresponding to the analog video signal exists;
if the analog video format information corresponding to the analog video signal exists, detecting the analog video format information corresponding to the analog video signal; and
converting a format of the corresponding signal from the detected analog video format information,
wherein, if the deciding step decides the input video signal is the digital signal, the method further comprises deciding whether the digital video signal is carrying digital video format information, and detects the digital video format information of the corresponding digital video signal if the digital video format information exists, and
wherein if the digital video format information does not exist, the method further comprises displaying a background color or a predetermined pattern on a display device.

* * * * *